United States Patent
Marchand et al.

(10) Patent No.: US 9,852,496 B2
(45) Date of Patent: Dec. 26, 2017

(54) SYSTEMS AND METHODS FOR RENDERING A DISPLAY TO COMPENSATE FOR A VIEWER'S VISUAL IMPAIRMENT

(75) Inventors: Pierre Marchand, Paris (FR); Eric Pite, Cambridge, MA (US); Hervé Guillemet, Gif sur Yvette (FR); Loic Trocme, Suresnes (FR)

(73) Assignee: BACK IN FOCUS, Sartrouville (FR)

( * ) Notice: Subject to any disclaimer, the term of this patent is extended or adjusted under 35 U.S.C. 154(b) by 249 days.

(21) Appl. No.: 13/703,164

(22) PCT Filed: Jun. 10, 2011

(86) PCT No.: PCT/US2011/039993
§ 371 (c)(1),
(2), (4) Date: Jan. 31, 2013

(87) PCT Pub. No.: WO2011/156721
PCT Pub. Date: Dec. 15, 2011

(65) Prior Publication Data
US 2013/0120390 A1 May 16, 2013

Related U.S. Application Data

(60) Provisional application No. 61/397,537, filed on Jun. 11, 2010.

(51) Int. Cl.
*G06T 5/00* (2006.01)
*G06T 5/20* (2006.01)
*G09G 5/00* (2006.01)

(52) U.S. Cl.
CPC .............. *G06T 5/006* (2013.01); *G06T 5/003* (2013.01); *G09G 5/00* (2013.01);
(Continued)

(58) Field of Classification Search
CPC ............................................ G06T 5/00–5/006
See application file for complete search history.

(56) References Cited

U.S. PATENT DOCUMENTS

| 6,575,574 B2 | 6/2003 | Della Vecchia et al. |
| 2002/0063807 A1 | 5/2002 | Margulis |

(Continued)

OTHER PUBLICATIONS

Howard C. Howland et al, "A subjective method for the measurement of monochromatic aberrations of the eye", J. Opt. Soc. Am., vol. 67, No. 11, Nov. 1977, pp. 1508-1518.*

(Continued)

*Primary Examiner* — Tize Ma
(74) *Attorney, Agent, or Firm* — Pillsbury Winthrop Shaw Pittman LLP

(57) ABSTRACT

A system and method is provided for rendering on a display of an electronic device a pre-corrected image of an original image to compensate for a visual impairment of a user of the device, such that the pre-corrected image when displayed on the display would be perceived by the user to be in better optical focus than the user would perceive a display of the original image. The method includes receiving hardware characteristics of the display, receiving at least one parameter describing the visual impairment of the user, receiving at least one parameter describing the conditions under which the display is seen by the user, calculating a pupil function, calculating a Point Spread Function (PSF), calculating a pre-corrected image corresponding to at least a portion of the original image to compensate for the visual impairment of the user, and rendering on the display the pre-corrected image.

14 Claims, 6 Drawing Sheets

(52) U.S. Cl.
CPC ............... *G09G 2320/0261* (2013.01); *G09G 2320/0285* (2013.01); *G09G 2340/14* (2013.01); *G09G 2360/144* (2013.01); *G09G 2380/08* (2013.01)

(56) References Cited

U.S. PATENT DOCUMENTS

| | | |
|---|---|---|
| 2005/0213040 A1 | 9/2005 | Gross et al. |
| 2006/0285754 A1* | 12/2006 | Steinberg et al. ............ 382/224 |
| 2007/0126657 A1* | 6/2007 | Kimpe ............................. 345/55 |
| 2007/0269126 A1 | 11/2007 | Choe et al. |
| 2007/0286514 A1 | 12/2007 | Brown et al. |
| 2008/0007626 A1 | 1/2008 | Wernersson |

OTHER PUBLICATIONS

International Search Report as issued for PCT/US2011/039993.
Oyamada et al.; "Focal Pre-Correction of Projected Image for Deblurring Screen Image"; Graduate School of Science and Technology, Keio University (2007), URL:http://www.procams.org/procams2007/papers/paper3_Oyamada.pdf.
Alonso Jr. "A Method for Enhancing Digital Information Displayed to Computer Users with Visual Refractive Error Via Spatial and Spectral Processing", Florida International University (2007), URL:http://proquest.umi.com/pqdlink?

* cited by examiner

SYSTEMS AND METHODS FOR RENDERING A DISPLAY TO COMPENSATE FOR A VIEWER'S VISUAL IMPAIRMENT

RELATED APPLICATIONS

This application is the U.S. National Stage of PCT/US2011/039993, filed Jun. 10, 2011, which in turn claims the priority and benefit to U.S. provisional patent application No. 61/397,537, entitled "Adaptation of Digital Images" and filed on Jun. 11, 2010, which is hereby incorporated by reference the contents of all applications are incorporated herein by reference in their entireties.

TECHNICAL FIELD

The present invention relates generally to the field of user interface for visually impaired people, and, in particular, to optometry and digital image processing.

BACKGROUND

Hundreds of millions of people must wear glasses occasionally to correct for any eye impairment. In particular, presbyopia (also called farsightedness or old sight) affects more than 1.2 billion people around the world. Presbyopia normally develops as a person ages, and is associated with a natural progressive loss of accommodation. The presbyopic eye often loses the ability to refocus rapidly and easily on objects at varying distances. There may also be a loss in the ability to focus on objects at near distances. Although the condition progresses over the lifetime of an individual, the effects of presbyopia usually become noticeable after the age of 45 years. By the age of 65 years, the crystalline lens has often lost almost all elastic properties and has only limited ability to change shape. This visual impairment is a permanent source of frustration because of the rapid rise in the use of personal digital display devices in mobile phones, tablet computers, car navigation systems (GPS), and many other devices. It is inconvenient when a mobile phone user suffering from presbyopia receives a call but does not have time to find his glasses to read the display to identify the caller or tries to read from a GPS in an automobile while driving.

Known methods and devices for treating presbyopia seek to provide vision approaching that of an emmetropic eye. In an emmetropic eye, both distant objects and near objects can be seen clearly due to the accommodation properties of the eye. To address the vision problems associated with presbyopia, reading glasses have traditionally been used by individuals to add plus power diopter to the eye, thus allowing the eye to focus on near objects and maintain a clear image. This approach is similar to that of treating hyperopia, or farsightedness. Presbyopia has also been treated with bi-focal eyeglasses, where one portion of a lens of the eyeglasses is corrected for distance vision, and another portion of the lens is corrected for near vision. A more advanced implementation of this principle led to the concept of progressive eyeglasses. Contact lenses and intraocular lenses (IOLs) have also been used to treat presbyopia. Other approaches include bilateral correction with either bi-focal or multi-focal lenses. In the case of bi-focal lenses, the lens is made so that both a distant point and a near point can be focused. In the multi-focal case, there exist many focal points between near targets and far targets.

Optically, presbyopia is the result of the visual image being focused behind the retina rather than directly on it causing the image to be blurred. The use of glasses or contact lenses changes the direction of rays of light to cause the visual image to be focused on the retina rather than behind it, resulting in a sharp image. FIG. 1 schematically shows an eye with insufficient refractive power. This is the typical case of a presbyopic person looking at a close object. The light emitted by a point source, instead of being focused on the retina, is focused behind the retina. This results in the person seeing a spot instead of a point. To a first approximation, this spot is a disc. However, effects such as diffraction, monochromatic aberrations like astigmatism, and chromatic aberrations may cause this spot to have a more complex shape. The spot is called the point spread function (PSF) of the global optical system. When looking at a complete image composed of multiple point sources located at the same distance from the eye, each point generates a similar spot at a different position on the retina. These spots overlap, as shown in FIG. 2, causing the impression of blur. Visual impairments other than presbyopia or farsightedness can be described with the same principles.

The mathematical operation corresponding to replacing all points in the image by overlapping spots is called a convolution. Corrective lenses, like reading glasses, add the missing refractive power to the eye so that the image of each point is focused on the retina or close to the retina, yielding a PSF with a small extent. For visually impaired people looking at the screen of an electronic device there has been no effective way to correct for this problem other than optical correction. There has been no effective solution to correct vision directly at the source rather than at the eye level (e.g. glasses).

SUMMARY

An object of some embodiments is to use digital image processing to compensate for presbyopia.

In an embodiment, provided is a method for rendering on a display of an electronic device a pre-corrected image of an original image to compensate for a visual impairment of a user of the device, such that the pre-corrected image when displayed on the display would be perceived by the user to be in better optical focus than the user would perceive a display of the original image. The steps of the method implemented include receiving hardware characteristics of the display, receiving at least one parameter describing the visual impairment of the user, receiving at least one parameter describing the conditions under which the display is seen by the user, calculating a pupil function, calculating a Point Spread Function (PSF) or any other mathematically equivalent representation of the imaging capability of the eye's optical system, like the optical transfer function (OTF), calculating a pre-corrected image corresponding to at least a portion of the original image to compensate for the visual impairment of the user, and rendering on the display the pre-corrected image.

In yet another embodiment, the step of receiving hardware characteristics of the display includes the step of receiving the hardware characteristics from a local database.

In yet another embodiment, the step of receiving a parameter describing the visual impairment of the user includes at least one of the steps of receiving the visual impairment parameter from a remote database, a local database, real-time input, or real-time estimation.

In yet another embodiment, the step of receiving a parameter describing the conditions under which the display is seen by the user includes at least one of the steps of receiving the display condition parameter from real-time estimation, real-time input, or a local database.

In yet another embodiment, the electronic device is one from the group consisting of a mobile telephone, a laptop computer, a desktop computer, a tablet computer, a television, a navigation system, a car electronic dashboard, a watch, a camera, an electronic book, a media player, a video game console, a vending machine, and a head-up display.

In yet another embodiment, the visual impairment is at least one from the group consisting of myopia, astigmatism, presbyopia, hyperopia.

In yet another embodiment, the step of receiving hardware characteristics of the display includes the step of receiving at least one from the group consisting of pixel dimensions and spacing, display width and height, display reflectivity, emission spectrum, and a relationship between pixel value and luminance.

In yet another embodiment, the step of receiving a parameter describing the visual impairment includes the step of receiving at least one parameter from the group consisting of a Sphere parameter of an eyeglass prescription, a Cylinder and axis parameters of an eyeglass prescription, and a measure of an accommodation.

In yet another embodiment, the step of receiving a parameter describing the visual impairment includes the step of measuring the wave front aberration map of the eye or the step of measuring the accommodation of the eye.

In yet another embodiment, the step of receiving a parameter describing the conditions under which the display is seen includes the step of receiving one or more of a measurement of the distance between the eye of the user and the screen, an ambient luminosity, and a measurement of the pupil size of the user.

In yet another embodiment, the step of rendering comprises the step of rendering of font glyphs.

In yet another embodiment, the step of receiving a parameter describing visual impairment includes one or more of the steps of receiving input from the user during a configuration stage, receiving input from another device, or measuring the visual impairment parameters by using the device.

In yet another embodiment, the step of receiving by user input the distance between the user's eyes and the screen or estimating the distance in real-time is performed by receiving measurements from at least one of: a speaker and a microphone embedded in the device, a camera embedded in the device, an infrared transmitter/receiver, or a radio beam transmitter/receiver.

In yet another embodiment, the step of estimating pupil size in real-time is performed by receiving measurements from an embedded ambient light sensor or an embedded camera.

In yet another embodiment, the step of calculating a PSF comprises calculating a PSF per sub-pixel class of the display and the step of rendering on the display the pre-corrected image includes the step of rendering the pre-corrected image for each sub-pixel class.

In yet another embodiment, the step of calculating a pre-corrected image is performed using a constrained optimization problem employing a gradient descent or using a Van-Cittert algorithm.

In yet another embodiment, the constrained optimization problem is formulated based on a metric accounting for the variation of sensitivity of eye receptors due to luminance.

In yet another embodiment, the constrained optimization problem is formulated based on an objective function representing an overall image quality as perceived by the user.

In yet another embodiment, the metric comprises a measure of a discrepancy between a retinal image and an image of a graphical object of reference having contrast attenuated by using an increasing function of one of luminance or pixel value.

In yet another embodiment, the objective function is based on a measure of a discrepancy between a retinal image and an image of a graphical object of reference having contrast attenuated by using an increasing function of luminance or a pixel value, and on the magnitude of the contrast attenuation.

In yet another embodiment, the pre-corrected image is calculated using Wiener deconvolution.

In yet another embodiment, the calculated pre-corrected image includes pixel values scaled using an increasing function of one of a luminance value or pixel value.

In yet another embodiment, the parameter describing the visual impairment of the user and the parameter describing the conditions under which the display is seen are determined by the step of performing a dichotomy test, where the dichotomy test includes the step of presenting to the user images pre-corrected using different hypotheses for user-designation of the images viewed best by the user.

In yet another embodiment, the step of rendering further includes the step of designating a preference of the image portion to be rendered.

In yet another embodiment, the step of designating a preference includes designating rendering of text on the display, rendering of a specific portion of the display, rendering of images on the display, and inhibiting rendering.

In yet another embodiment, rendering is enabled or disabled by striking a hard key, varying an option, shaking the device, or using an embedded camera to detect eyeglasses being worn by the user.

In another embodiment, provided is a system for rendering on a display of an electronic device a pre-corrected image of an original image to compensate for a visual impairment of a user of the device, such that the pre-corrected image when displayed on the display would be perceived by the user to be in better in optical focus than the user would perceive a display of the original image. The system includes a computer processor and a memory connected to the computer processors, where the memory is configured with instructions to cause the processors to (1) receive hardware characteristics of the display screen from a local database, (2) receive a parameter describing the visual impairment of the user from at least one of a remote database, a local database, real-time input, or real-time estimation, (3) receive a parameter describing a condition under which the display is seen by the user from at least one of real-time estimation, real-time input, or local database, (4) calculate a pupil function, (5) calculate a Point Spread Function (PSF), (6) calculate a pre-corrected image corresponding to at least a portion of the original image to compensate for the visual impairment of the user, and (7) render on the display the pre-corrected image.

In another embodiment, provided is a non-transitory computer readable storage medium storing a program configured for execution by a processor, the program when executed being adapted to cause the processor to: receive a hardware characteristic of the display from a database; receive a parameter describing the visual impairment of the user from a remote database, a local database, real-time input, or real-time estimation; receive a parameter describing the conditions under which the display is seen by the user from at least one of real-time estimation, real-time input, or local database; calculate a pupil function; calculate a Point Spread Function (PSF); calculate a pre-corrected image corresponding to at least a portion of an original image to compensate for a user's visual impairment; and render the pre-corrected mage on a display of the electronic device, whereby the display of the pre-corrected image would be perceived by the user to be in better optical focus than the user would perceive a display of the original image.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principle of the invention. In the drawings.

DETAILED DESCRIPTION

Reference will now be made in detail to embodiments, examples of which are illustrated in the accompanying drawings. In the following detailed description, numerous non-limiting specific details are set both in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on many types of electronic personal devices comprising a digital display.

The solution according to the present invention is software based. Knowing the deformation introduced by the eyes (i.e. the vision impairment condition) the software pre-corrects an image in a manner related to the user's specific vision impairment by introducing an organized blur that will compensate for the impairment and result in the user perceiving an image that is more clear.

Figure 1:
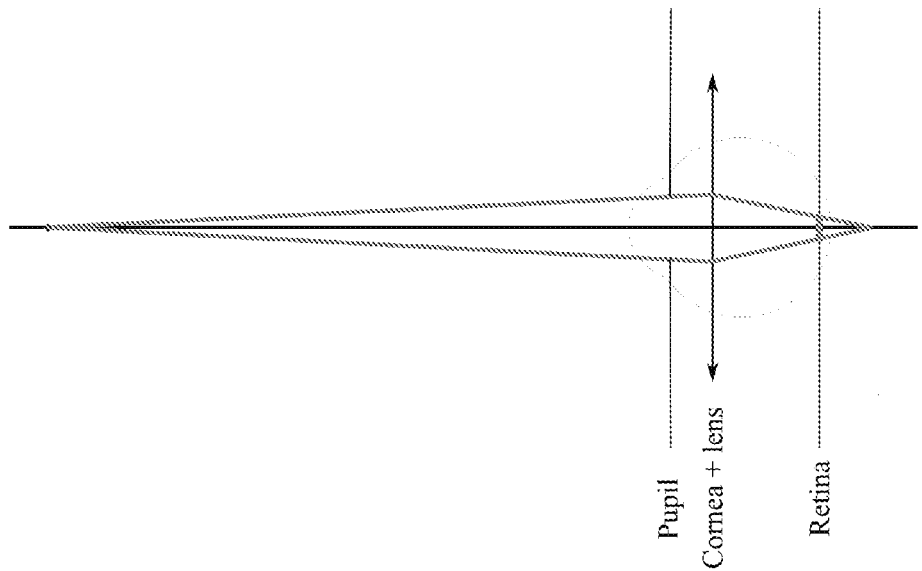
FIG. 1 shows the formation of a spot on the retina of a presbyopic eye looking at one point source.
Figure 2:
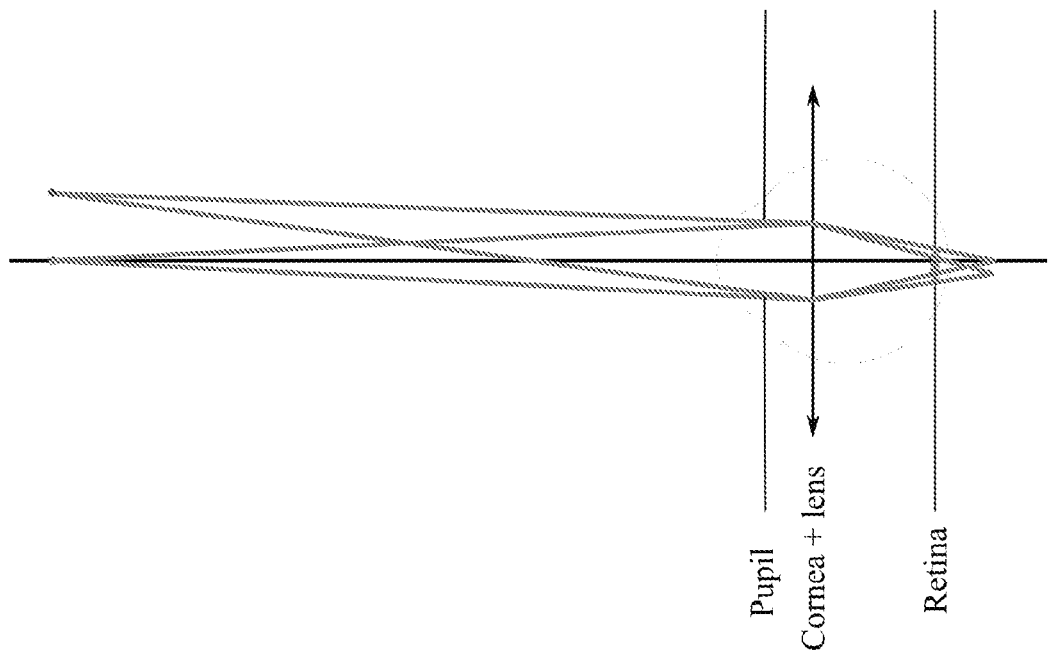
FIG. 2 shows the formation of two overlapping spots on the retina of a presbyopic person when he or she looks at two point sources.
Figure 3:
FIGS. 3(a) and (b) schematically show the display of a smartphone as seen by a non-visually impaired eye and a presbyopic person, respectively.
Figure 4:
FIGS. 4(a) and (b) schematically show a corrected display of a smartphone, according to the present invention, as seen by a non-visually impaired person and by a presbyopic person, respectively.

In a branch of digital image processing called image restoration, techniques (often called deconvolution) are used to correct for defocus or other optical perturbations and to make it possible to estimate the original object from a blurred image. The use of digital image processing in the context of the present invention is derived from image restoration techniques but in general reverses the order of operations: deconvolution is applied before the image is blurred by the eye. For purposes of the present invention such processing is referred to as "pre-correction." A defocused eye looking at a pre-corrected image will cancel the effect of pre-correction and see a sharp image. In practice, pre-correction modifies the image displayed to the user so that the overlapping spots generated by individual pixels partially negate each other and produce a sharp retinal image. FIG. 3 (a) is an example of an original or reference image. FIG. 3 (b) is the corresponding simulation of what a presbyopic person sees. FIG. 4 (a) is a simulated pre-corrected image. FIG. 4 (b) is a simulation of what the same person sees when looking at FIG. 4 (a). Although the contrast may be reduced, the global readability of the display, as represented on FIG. 4 (b), is greatly improved compared to FIG. 3 (b).

Figure 5:
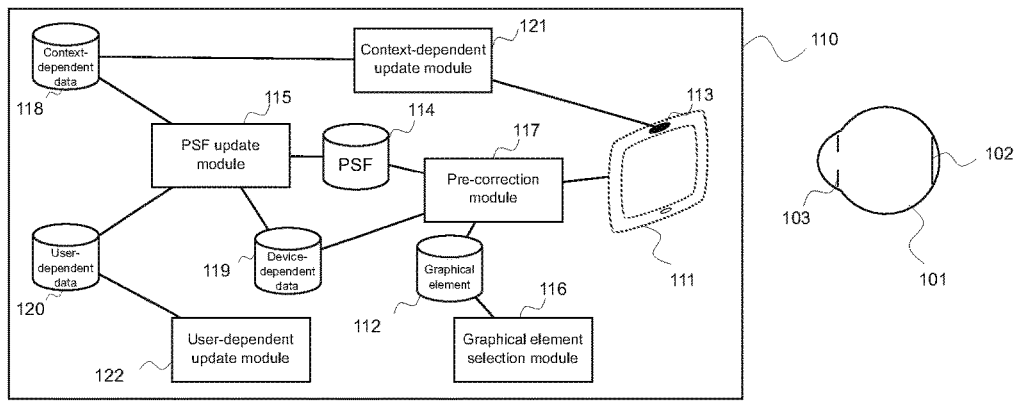
FIG. 5 is a block diagram illustrating exemplary system architecture of the present invention.

FIG. 5 is a block diagram illustrating an exemplary system 100 in accordance with the present invention. The exemplary system 100 comprises an electronic device 110 displaying content (e.g., text and/or images) on a monitor 111, after being processed by a pre-correction module 117 so that the eye 101 of the user can see the content sharply even if the user is visually-impaired (e.g., a presbyopic or far-sighted user). The image will not be focused on the retina 102 for an uncorrected eye 101) but will still be perceived as a sharp image.

Figure 6:
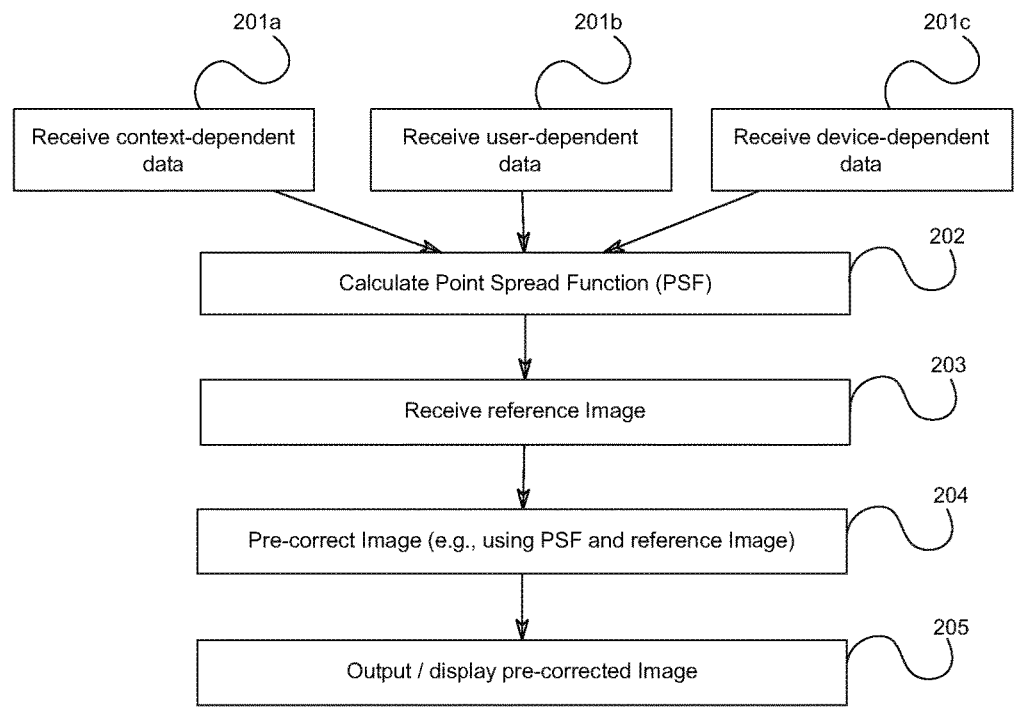
FIG. 6 is a flow diagram showing the succession of steps involved in the vision compensation method of the present invention.

FIG. 6 is a flowchart illustrating the steps of the processing method according to non-limiting embodiments. Step 201a collects context-dependent data. Context-dependent data represents the conditions under which the device is seen by the user. It is stored in memory 118. It typically includes the pupil size, the viewing distance between the device 110 and the eye 101, and the level of the ambient light. The exact list of parameters depends on the model used for PSF calculation during step 202. In some instances one or more of these parameters can be considered constant and not necessary to update. For example, under normal condition of use the distance between a screen included in the dashboard of an automobile and the eye of the driver can be considered relatively constant. Other parameters may be updated by module 121 when the conditions under which the device is used change. According to an embodiment of the present invention, module 121 detects changes and estimates new values of the parameters using data acquired from embedded sensors 113:

As an example, an image may be received from an embedded front camera and the head of the user may be recognized and measured using conventional techniques in order to estimate the distance between the eye of the user and the display screen. Images may also be received from an embedded front camera in order to recognize and measure the size of the user's pupil using conventional techniques. Also, ambient light measures may be received from an embedded light sensor.

Such sensors are commonly used by mobile devices in order to adjust the brightness of the screen back-light. If direct measurement of the pupil size cannot be made by the device, considering that the pupil size depends on the intensity of light received by the eye, pupil size may be estimated using a model based on a measure of the level of ambient light and the light intensity emitted by the device screen. Radio beam (infrared, WiFi, 3GPP or the like) may be used to estimate the distance between the user and the display screen. This technique, called "a head tracking system," has been used in devices such as game consoles. Similar to a radio beam, an audio signal can be emitted by a speaker in a device and its echo detected by a microphone in order to estimate the distance between the user and the display screen. Applications for smartphones are known which use the embedded speaker and microphone to estimate the distance to surrounding objects. Also, motion detection may be received from motion sensors (e.g. an accelerometer, a gyroscope or the like) in order to detect position change and estimate the new position a user relative to a device.

Step 201b collects user-dependent data. User-dependent data characterizes the visual impairment of the user. As in the case of context-dependent data, user-dependent data may be stored in memory 120. It may be expressed as a discrete estimate of the wave aberration function of each eye of the user for a given viewing distance and a given wavelength. It may also include the user accommodation expressed, for instance, as the near point of accommodation. The exact type and nature of the parameters depend on the model used for PSF calculation during step 202. Module 122 computes or acquires the user-dependent data from different possible inputs. For example, the user may enter the parameters of en eyeglass prescription, namely the Sphere (S), Cylinder (C) and Axis (A) parameters for each eye. The user may also enter the additional refractive power (ADD or NV) or a self estimate of his or her near point of accommodation. When the user enters new parameters, module 122 determines the user-dependent data and updates memory 120. Mathematical models for computation of the wavefront aberration functions from such parameters are well known to those skilled in optometry, and may involve notably decomposition over Zernike polynomials.

Alternatively, an auto-diagnosis program may be run. Such a program presents the user different patterns on a display, e.g., the user's handheld display, and asks the user to enter whether he or she sees the detail of the pattern in absolute terms or comparatively with respect to other displays. Optionally, the program can be associated with optical elements in order to measure more precisely the refractive errors using known inverse Shack-Hartmann techniques. Alternatively, the auto-diagnosis program presents the user pre-corrected chart images assuming various typical PSF's, the parameters of which can be updated step by step by dichotomy until the user no longer sees improvement. Module 122 derives an estimate of the user-dependent data and updates memory 120 each time the auto-diagnosis program is run.

As another alternative, if the user's device can connect to the internet, the user-dependent data may be retrieved from a remote database through the internet. The data may have been previously stored in the remote database after being collected by one of the above-mentioned alternatives. The data may also have been stored in the remote database after an optometric examination using, e.g., a Shack-Hartmann wavefront sensor.

In yet another alternative, user-dependent data stored in one personal device (e.g., a smartphone, tablet computer, smart card, etc.) may be transferred to another personal device using short-range transmission means (e.g. NFC, Bluetooth, etc.) or through smart card contact. The data may have been previously stored in the personal device after being collected by one of the just-mentioned alternatives. The data may also have been stored in the personal device after an optometric examination using, as mentioned above, a Shack-Hartmann wavefront sensor, for example.

Step 201c collects device-dependent data. Device-dependent data are characteristics of the display screen that affect the computation of the PSF during step 202. The exact list and nature of the parameters depends on the model used for PSF calculation. They typically comprise the pixel (sub-pixel) size, the emission spectra of each pixel or sub-pixel class (e.g. the red sub-pixels, the green sub-pixels and the blue sub-pixels), the luminosity of pixels or sub-pixels as a function of the pixel value (sometimes called the gamma function), and the screen reflectivity. These parameters are stored in memory 119 and in some situations may be considered constant. However, memory 119 may be updated when the screen luminosity or other calibration values change.

Step 202 computes the PSF from the data received during steps 201a, 201b, and 201c (or any other mathematically equivalent representation of the imaging capability of the eye's optical system, like the optical transfer function (OTF)). In the context of a preferred embodiment of the present invention, the PSF is defined as the retinal color image of a pixel, as viewed by the user at a given distance, and comprising a number of sub-pixels, each of them emitting with a dominant color but still having an emission spectrum not necessarily purely monochromatic. As explained herein, various methods can be used during step 202.

Figure 7:
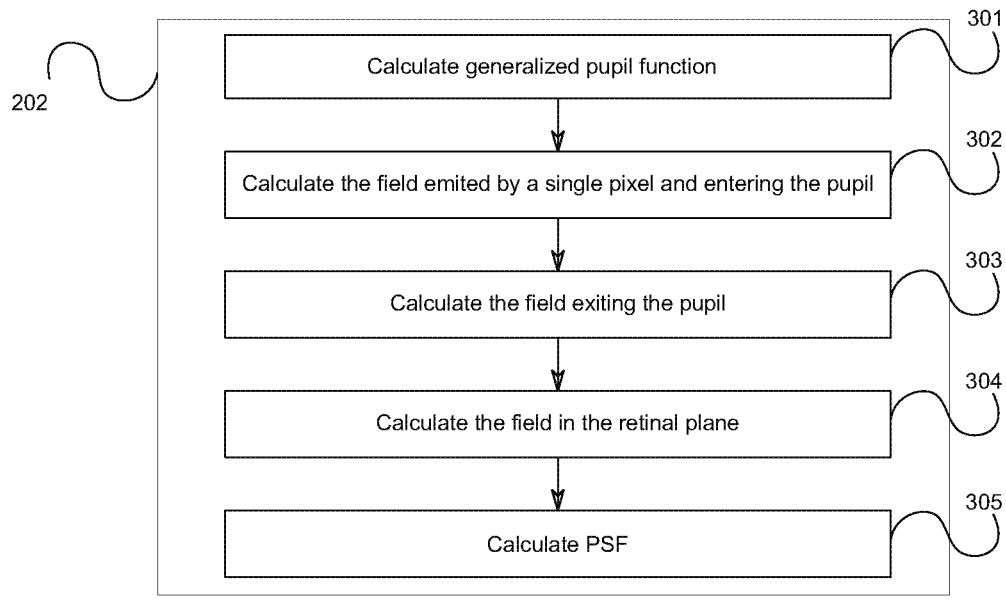
FIG. 7 is a flow diagram showing the succession of steps involved in the calculation of a monochromatic PSF.

FIG. 7 illustrates the sub-steps 301-305 of step 202 for an exemplary embodiment, when the pixels are assumed to emit light in a single frequency. At step 301, the generalized pupil function is calculated and describes how the light wave is modified by the eye's optical system for a different position in the pupil. The pupil function may be expressed according to Equation (1) as:

$$P(\rho,\theta)=\alpha(\rho,\theta)\exp(ikW(\rho,\theta)) \quad (1)$$

where α is the amplitude transmittance of the pupil, W is the wave aberration function, $$i=\sqrt{-1}, k=\frac{2\pi}{\lambda},$$

λ is the wavelength, and ρ and θ are the polar coordinates in the pupil.

W is a function of the user-dependent data (e.g., visual impairment and accommodation), the context-dependent data (e.g., view distance), and/or the device-dependent data (e.g., wavelength λ).

In a model, expressed below, a has the value of 1 inside the circle aperture of the pupil, and the value of 0 outside. The model may be expressed according to Equation (2) as:

$$\alpha(\rho,\theta) = \begin{cases} 1 & \text{if } \rho < D \\ 0 & \text{otherwise} \end{cases} \quad (2)$$

where D is the pupil size from the context-dependent data.

In some embodiments the Stiles-Crawford effect, where there is a different sensitivity of cones depending on the light direction, may be considered in order to better approach the true PSF of the eye. In such circumstance, instead of a having a constant value of 1 inside the aperture, the following Equation (3) may be used:

$$\alpha(\rho, \theta) = \begin{cases} \exp(-\beta\rho^2/2) & \text{if } \rho < D \\ 0 & \text{otherwise} \end{cases} \quad (3)$$

where $\beta$ is a constant representing the average amplitude of the Stiles-Crawford effect in the population and may take the value 0.116 mm$^{-2}$.

Figure 8:
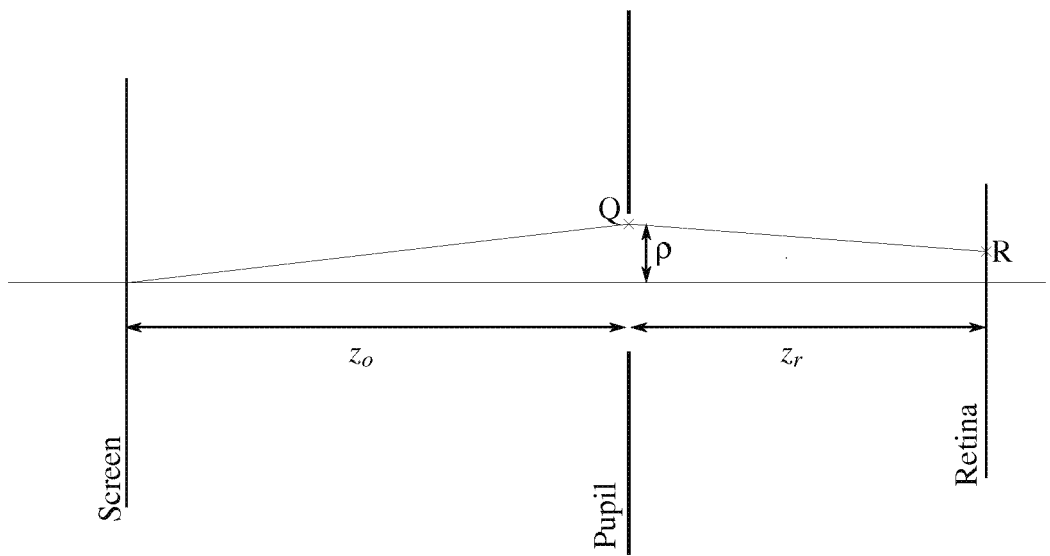
FIG. 8 is a diagram schematically illustrating the geometry behind the calculation of a PSF.

At step 302, the optical field entering the pupil is calculated. Using the assumption that a pixel is a point source with no dimension located at distance $z_0$ from the pupil on the optical axis (see, e.g., FIG. 8), the field entering the pupil may be expressed in Equation (4) as:

$$S(\rho, \theta) = \frac{A_0}{\sqrt{\rho^2 + z_0^2}} \exp\left(ik\sqrt{\rho^2 + z_0^2}\right) \quad (4)$$

where $A_0$ is the amplitude of the point source. At step 303, the field exiting the pupil is calculated using Equation (5) as:

$$U(\rho,\theta) = S(\rho,\theta)P(\rho,\theta) \quad (5)$$

At step 304, the field on the retinal plane I is calculated. In some embodiments, the Rayleigh-Sommerfeld diffraction formula of the first kind may be used and is expressed in Equation (6) as:

$$I(R) = \frac{iA_0}{\lambda} \int\int_Q U(Q) \frac{\exp(ik\|\overrightarrow{QR}\|)}{\|\overrightarrow{QR}\|} \cos(\vec{n}, \overrightarrow{QR}) dS \quad (6)$$

where R is a point of the retina, Q is a point of the pupil, dS is a small surface element including Q and $\vec{n}$, the normal value to the pupil plane.

Under some assumptions, known as the Fraunhofer approximation, the diffraction formula, I(R), becomes the inverse Fourier transform of U(Q). Some embodiments may use an inverse Fast Fourier Transform instead of direct computation of the Rayleigh-Sommerfeld diffraction formula.

At step 305, the PSF is computed from I(R) as a square modulus and is expressed in Equation (7) as:

$$PSF = |I(R)|^2 \quad (7)$$

The resulting PSF may be called a monochromatic PSF because it is computed under the assumption that the pixel emits light at a single wavelength $\lambda$.

Figure 9:
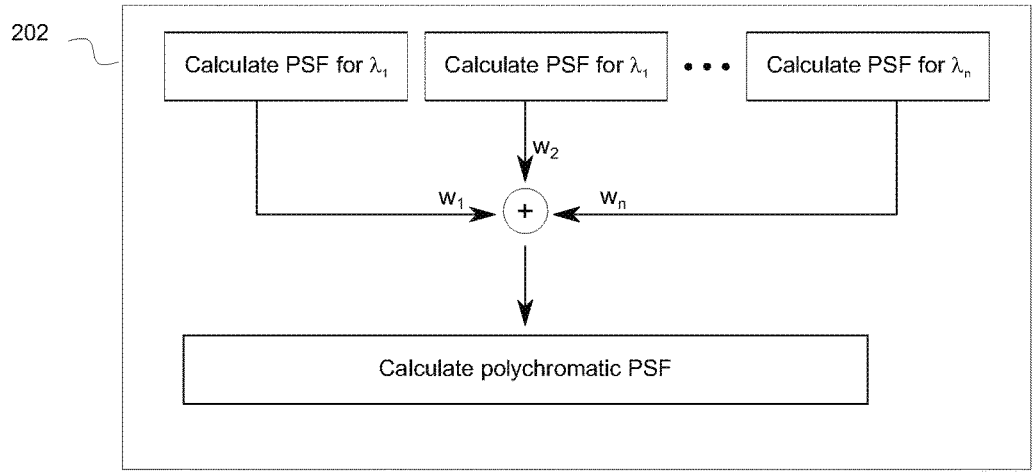
FIG. 9 is a flow diagram illustrating the calculation of a polychromatic PSF.

FIG. 9 illustrates the sub-steps of step 202 for an exemplary embodiment that calculates a polychromatic PSF for a given sub-pixel class. One polychromatic PSF may be computed per sub-pixel class (e.g., one polychromatic PSF may be computed for each of the Red sub-pixel class the Green sub-pixel class, and the Blue sub-pixel class). Each sub-pixel class may be characterized by an emission spectrum that may be pre-stored in a memory 119 as a part of device-dependent data. The stored emission spectrum may consist of a set of values representing the emitting power of the sub-pixel class at a number of frequencies spanning around the nominal frequency characterizing the color of the sub-pixel class. For each sub-pixel class, the polychromatic PSF may be calculated by computing the weighted average of monochromatic PSF's calculated for each frequency, $\lambda_i$ which is part of the emission spectrum, and then multiplied by the power $w_i$ from the emission spectrum.

In some embodiments, the terms of the above weighted average may be further weighted by the photopic spectral sensitivity at each frequency. The average photopic spectral sensitivity function of the human retina may be found in academic literature.

The refractive power of an optical system, like an eye, depends on the wavelength. At some point, the eye can only be focused perfectly for a single wavelength. This phenomenon results in so-called chromatic aberrations. In some embodiments there may be a defocus sub-step at step 301, in the wave aberration function depending on the wavelength, to account for such chromatic aberrations. The amount of defocusing to be done may be found in academic literature.

Figure 10:
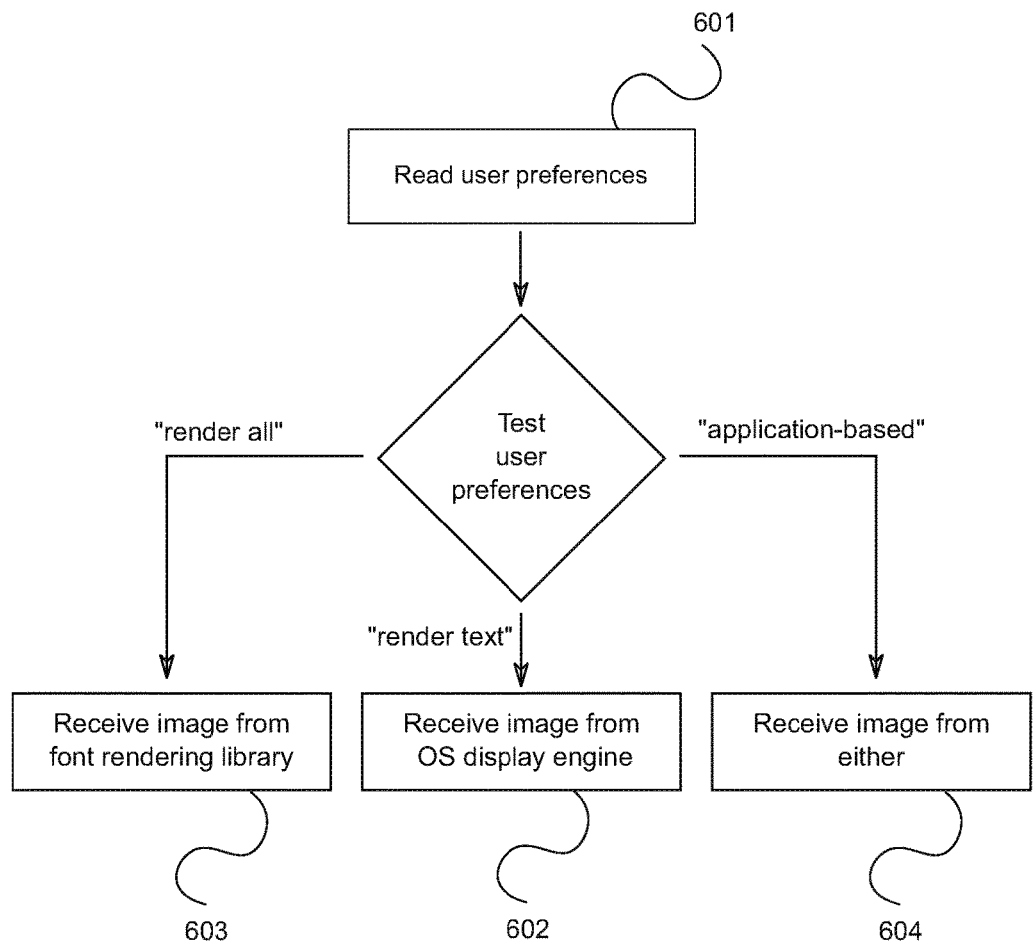
FIG. 10 is a flow diagram detailing how a reference image is received.

At step 203, the image that will be processed by the pre-correction algorithm is received. This image is called the reference image. How the reference image is received may be based on user preference(s) and criteria stemming from running applications. FIG. 10 illustrates an exemplary embodiment of the image received at step 203. At step 601, a memory containing the user's preference is read. The user may have set his preference to, e.g., "render text," "render all," "application-based" rendering, or "render nothing". Step 602 is performed if the preference is set to "render text"; step 603 is performed if the preference is set to "render all"; step 604 is performed if the preference is set to "application-based"; and, steps 204 and 205 may not be performed if the preference is set to "render nothing."

In some embodiments, toggling between "render nothing" and the preference stored in memory previously may be performed if the user strike a dedicated hard key on the device; the embedded accelerometer triggers pre-correction on/off; detecting when the user shakes the device in a specified way; or by the camera detecting that the user is wearing his eyeglasses (or not) and transmitting an instruction to, for example, the module(s) that execute any of steps 601-604. The instruction may be to switch the pre-correction process on/off. The foregoing technique may be performed if the user has specified that he does not wear corrective/contact lenses a priori.

In some embodiments, all text displayed to the user like, for example, when he sets an option in the preference menu, may be shown using large-sized fonts until the pre-correction process is turned on.

At step 602, text may received by one or more modules from one or more applications, using a font-rendering library (e.g., of the operating system (OS) or software executing on the OS), when the applications include text. The font-rendering library may be used to output and/or render the appropriate text on small, off-screen images that may become the reference image(s) of step 204.

At step 603, an operating system display module (e.g., a compositing window manager) may ask an application to draw some portion of its display (e.g. by way of a method or function call) or may receive updates from an application for some portion of its display. In some embodiments, a rectangular or other portion of the application screen buffer containing the updated/changed portion may become the reference image of step 204.

At step 604, reference images may be received from the font rendering library or from an operating system display module. Text may be received from the font rendering library if the application calling its services is a text-based application, which may be included in a pre-stored list of such applications (e.g., SMS, e-mail, contact list, caller ID). In some embodiments, an image containing updated parts of an application display may be received from the operating system display module if the application is an image-based application, which may be included in a pre-stored list (e.g., photo manager, navigation application).

At step 204, the reference image received in step 203 is pre-corrected. The reference image, may be composed of a limited number of 1-component images corresponding to each sub-pixel class. In some embodiments, we may assume that, for example, $x_{ref}$ is such an image, expressed using luminance values, and $h_{imp}$ is the corresponding component of the PSF of an eye of a visually-impaired user. Assuming a suitable coordinate system and sampling distances are used, a discrete estimate of the image formed on the retina of the eye, $f_{ref}$, when the image is displayed, may be expressed in Equation (8) as:

$$f_{ref} = x_{ref} * h_{imp} \tag{8}$$

where * denotes the discrete convolution operator. In some embodiments, pre-correction consists in calculating an image $x_{cor}$ such that, when such an image is displayed instead of $x_{ref}$, it produces on the retina an image $f_{cor}$, which may be expressed in Equation (9) as $$f_{cor} = x_{cor} * h_{imp} \tag{9}$$

The image, $f_{cor}$, may be of "better quality" than $f_{ref}$. "Better quality" here means that the user may be able to perform a precise task relative to his usage of the device with better performance (for example, like reading the text displayed with less errors).

$x_{cor}$ may be expressed in Equation (10) as:

$$x_{cor} = \underset{x}{\operatorname{argmin}} d(f_{cor}, f_{obj}) \tag{10}$$

where $f_{obj}$ is the ideal retinal image and d is a metric quantifying the perceived difference between $f_{cor}$ and $f_{obj}$. The minimization may be carried out on the domain, D, containing the images x that can actually be displayed by the device. D is a set of images with pixel values that are not lower than the luminance of black, and not higher than the maximum luminance.

The choices for the values of $f_{obj}$, d, and the numerical method used to solve Equation (10) may each lead to various embodiments.

In some embodiments, $x_{att}$ may be a contrast-attenuated version of $x_{ref}$. Each luminance value, $x_{ref}(i)$, may be rescaled to $x_{att}(i) = R(x_{ref}(i))$, using an increasing function R. Minimum and maximum luminance values of the screen, $v_{min}$ and $v_{max}$, map respectively to $v_0 = R(v_{min})$ and $v_1 = R(v_{max})$, where $v_0$ and $v_1$ satisfy the inequality expressed in Equation (11) as:

$$v_{min} \le v_0 < v_1 \le v_{max} \tag{11}$$

R may be a linear function of the luminance, expressed in Equation (12) as:

$$R(v) = v_0 + \frac{v_1 - v_0}{v_{max} - v_{min}}(v - v_{min}) \tag{12}$$

Alternatively, R may be a linear function of the pixel value, expressed in Equation (13) as:

$$R(v) = L\left(\tilde{v}_0 + \frac{\tilde{v}_1 - \tilde{v}_0}{\tilde{v}_{max} - \tilde{v}_{min}}(L^{-1}(v) - \tilde{v}_{min})\right) \tag{13}$$

where L is the display function that converts a pixel value to a luminance value, $\tilde{v}_0 = L^{-1}(v_0)$ and $\tilde{v}_1 = L^{-1}(v_1)$ are the minimum and maximum pixel values of the contrast-attenuated image, and $\tilde{v}_{min} = L^{-1}(v_{min})$ and $\tilde{v}_{max} = L^{-1}(v_{max})$ are the minimum and maximum pixel values of the screen.

$f_{obj}$ may be set to $x_{att}$, the retinal image produced by a perfectly focused eye, having a PSF limited to a single point, when $x_{att}$ is displayed.

Alternatively, $f_{obj}$ may be set to $f_{obj} = x_{att} * h_{ref}$ where $h_{ref}$ is a realistic PSF of a non-impaired eye estimated by the method described above. $h_{ref}$ may be the PSF of a diffraction-limited eye, focused on the screen, with a pupil of same size than the user's pupil. In some embodiments, $h_{ref}$ may also be a polychromatic PSF that accounts for normal chromatic aberrations.

Metric d may be chosen from a variety of metrics, some of them known. The choice of a particular metric does not alter the spirit and scope of the invention.

In some embodiments, d may be the Euclidean metric.

Alternatively, d may be a metric that accounts for the varying sensitivity of the eye's receptors due to luminance, which may be expressed in Equation (14) as:

$$d(x, y) = \sum_i (p(x(i)) - p(y(i)))^2 \tag{14}$$

where p is a non-linear function associating a subjective brightness value to a luminance value. In some embodiments, p may be, for example, the inverse $L^{-1}$ of the display function L that converts pixel values to luminance values. In some embodiments, x(i) and y(i) may be the luminance values of a pixel, i, in image(s) x and y, respectively.

Equation 10 may be solved using a variety of known techniques. The choice of a particular technique does not alter the spirit or scope of this invention.

When d is the Euclidean metric, a solution to Equation (10) may be estimated using Wiener deconvolution, which may be expressed in Equation (15) as:

$$X_{cor} = \frac{H^*_{imp}}{|H_{imp}|^2 + K} F_{obj} \tag{15}$$

where $X_{cor}$, $H_{imp}$ and $F_{obj}$ are the discrete Fourier transforms of $x_{cor}$, $h_{imp}$ and $f_{obj}$ respectively, and $H^*_{imp}$ denotes the complex conjugate of $H_{imp}$. K, which in image restoration problems is linked to the power density spectrum of the noise, may act here as a regularization parameter that limits the high frequencies in $X_{cor}$, and, thus, the odds that $x_{cor}$ may exhibit values smaller than $v_{min}$ or larger than $v_{max}$. If such values still exist in $x_{cor}$, they are clamped in order to obtain an image $x_{cor}$, which belongs to domain D containing the images that can be displayed by the screen and may be expressed in Equation (16) as:

$$x_{cor} \leftarrow \begin{cases} x_{cor} & \text{if } v_{min} \le x_{cor} \le v_{max} \\ v_{min} & \text{if } x_{cor} < v_{min} \\ v_{max} & \text{if } x_{cor} > v_{max} \end{cases} \tag{16}$$

In some embodiments, Equation (10) may be solved using a constrained optimization algorithm. If d is the Euclidean metric, known algorithms for solving quadratic problems may be used. If d is defined by Equation (14), where p is an analytical differentiable function, the optimization may be carried out using a gradient descent method.

In some embodiments, as an alternative to a gradient descent method, the optimization may be carried out using the Van Cittert algorithm with constraints applied using the Jaanson techniques.

In some embodiments, as an alternative to Wiener deconvolution and iterative algorithms like gradient descending techniques or the Van Cittert algorithm, gradient descending techniques or the Van Cittert algorithm may be used after initializing their values with the result(s) of a Wiener deconvolution.

In some embodiments, the pre-corrected images may be determined without solving Equation (10) for each color component. Alternatively, the pre-corrected images for each sub-pixel class $x_{cor1}$, $x_{cor2}$, etc. may be determined simultaneously and together with function R in order to use the contrast attenuation that yields the viewed image with the "best quality." If function R is characterized by parameters $v_0$ and $v_1$ according to Equations (12) or (13), the pre-corrected images may be expressed in Equation (17) as:

$$(x_{cor1}, \ldots, x_{corJ}, v_{opt0}, v_{opt1}) \underset{x_1, \ldots x_J, v_0, v_1}{\mathrm{argmin}} \; Q(x_1, \ldots x_J, v_0, v_1) \quad (17)$$

where J is the number of sub-pixel classes, $v_{opt0}$ and $v_{opt1}$ are the parameters characterizing the optimal function R, and Q is a function that depends on $d(x_{corj}, f_{objj})$ and on the magnitude of contrast attenuation. The choice for function Q does not alter the spirit or scope of this invention.

In some embodiments, a metric d that accounts for the non-linear luminance sensitivity of the eye, Q, may be expressed in Equation (18) as:

$$Q(x, v_0, v_1) = \frac{1}{n(v_1 - v_0)^2} \sum_{j=1}^{J} \sum_{i} (p(f_{corj}(i)) - p(f_{objj}(i)))^2 + \mu \frac{v_{max} - v_{min}}{v_1 - v_0} \quad (18)$$

where n is the numbers of sub-pixels and μ is a constant parameter quantifying the relative contribution of contrast attenuation in the perceived image quality.

In some embodiments, the PSF may be computed from data that are only approximations of physical quantities. For example, the user's pupil size may be measured or estimated with a significant confidence interval, and the parameters describing the user's visual impairment cannot characterize perfectly the behavior of the eye's optical system. In some embodiments, in order to account for the resulting uncertainty on the PSF, instead of minimizing the perceived difference between $f_{obj}$ and $f_{cor}$ computed from a single PSF, the difference between $f_{obj}$ and a set of $f_{cor}$ computed from a plurality of PSFs may be minimized. Other embodiments may define a probabilistic function instead of metric d or function Q depending on the probability distribution of the uncertain parameters and minimize an index computed from the probabilistic function, like the expectation.

For some users, each eye may be affected by significantly different impairments, thus yielding a different PSF and, consequently, a different pre-correction. In some embodiments, in order to address such a scenario properly, a single PSF may be computed by combining the PSF's of both eyes or by computing a single PSF from combined user-dependent data of both eyes. The combination may be, for example, an arithmetic average of the PSF samples or of the user-dependent data, like the S.C.A. vision parameters. Alternatively, another mathematical combination may be used.

In order to further address the situation where each eye of the user may be affected by different impairments, in some embodiments, there may be an embedded autostereoscopic monitor capable of showing a different image to each eye. In such a scenario, the PSF of each eye may be stored and two corresponding pre-corrections may be computed for each graphical/image element.

In order to further address the situation where each eye of the user may be affected by different impairments, in some embodiments, a plurality of options may be presented to the user as preferences. The options may include, for example, pre-correcting using the PSF of the right eye only, pre-correcting using the PSF of the left eye only, pre-correcting using a PSF resulting from a combination of both PSF's of the left and right eyes, or pre-correcting using both PSF's of the left and right eyes as they are applied to the two elements of an autostereoscopic monitor.

In some embodiments, in order to limit the amount of processing performed each time new content is available for display to the user, or each time a part of the content displayed present should be updated/changed, step 204 may be separated into two sub-steps. First, a pre-corrected image may be calculated for a special image where all pixel values may be set to 0 and the value of one central pixel is set at its maximum luminance, for each sub-pixel class. The resulting pre-corrected image may be called the "inverse PSF" and stored in memory. Pre-correction of the actual images may be performed by convolving the reference image with the inverse PSF. In some embodiments, the convolution may be performed in the frequency domain, by: (a) applying a Fourier transform of the inverse PSF that may be stored in memory and a Fast Fourier Transform (FFT) to the image of reference, (b) performing a point-wise multiplication with the Fourier transform of the inverse PSF, and (c) applying an inverse FFT to the result of the multiplication.

FIG. 6 illustrates exemplary steps 201-205 for pre-correcting a reference image. Steps 201-205 do not need to be repeated for each new reference image. In some embodiments, caching techniques may be used to limit the amount of processing. Caching techniques may include, for example, where (a) the PSF is stored in memory 114 and its calculation during step 202 may be performed when there is a received data change, (b) the pre-corrected image resulting from step 204 may be stored in memory 114 if the same reference image is determined to be likely to be received again during, for example, step 203. In some embodiments, when pre-correcting text, the pre-correction may be performed separately for each letter and pre-corrected letters may be stored. When pre-corrected letters are stored, the next time text contains the same letter at the same size, the execution of step 204 for the letter may be limited to retrieving the stored letter from memory 114. In some embodiments, if step 204 uses an inverse PSF as described above, the inverse PSF may be stored with the PSF in memory 114 so that step 204, in the future, is limited to retrieving the inverse PSF and performing a convolution.

In some embodiments, step 205 outputs/displays the pre-corrected image.

Figure 11:
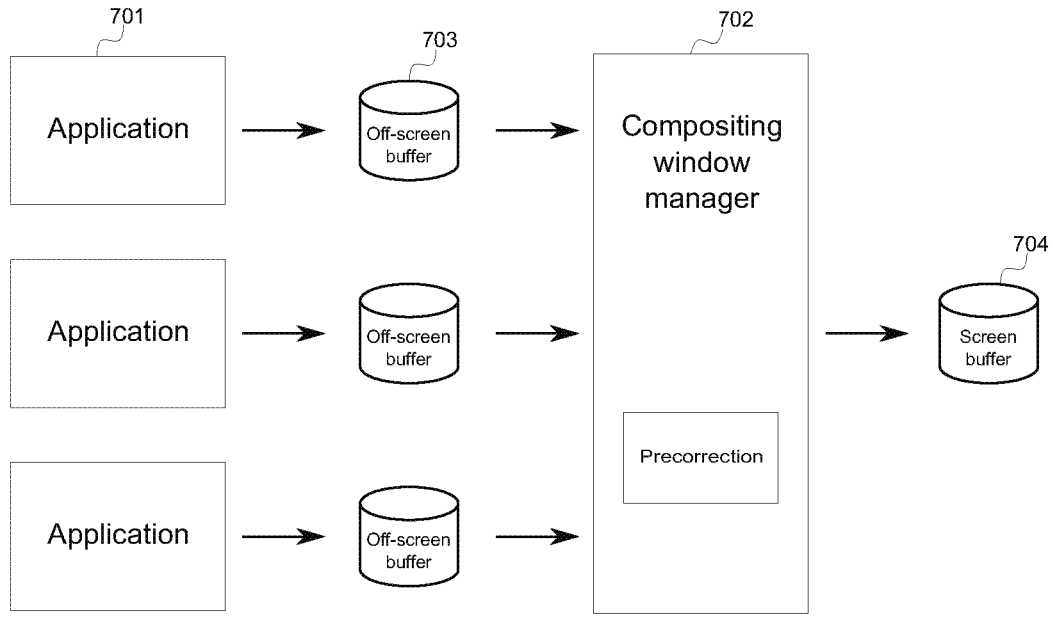
FIG. 11 is a flow diagram illustrating the integration of pre-correction at the window manager level.

FIG. 11 illustrates an exemplary embodiment of the pre-correction process. As shown in FIG. 11, the pre-correction module(s) are called by the compositing window manager 702, which then displays the pre-corrected image by modifying the screen buffer 704. The compositing window manager is a classical component of an operating system that aggregates the off-screen buffers 703 of each application before drawing the entire graphical interface to the screen buffer 704. In this embodiment, pre-correction may be implemented during composition of the application's display into the screen buffer and may be applied to screen buffers, or a part of the screen buffers, that contain the reference image received in step 203. This implementation may be suitable when the user's preference is set to "render all" (as described above).

Figure 12:
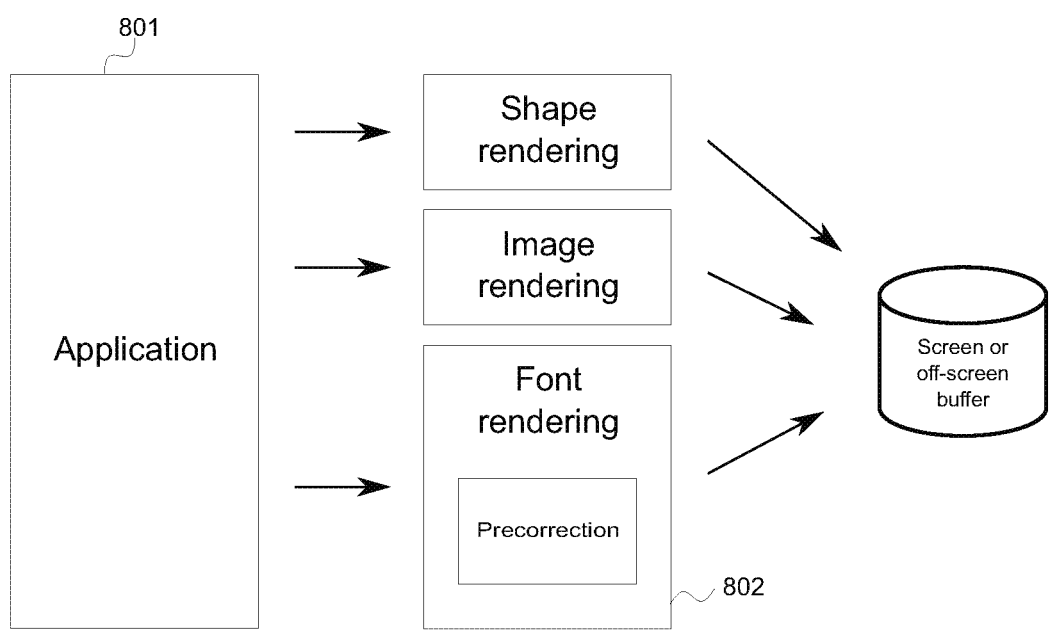
FIG. 12 is a flow diagram illustrating the integration of the pre-correction at the font rendering library level.

FIG. 12 illustrates an exemplary embodiment of the pre-correction process. As shown in FIG. 12, the pre-correction module(s) are called by a font rendering module 802 of the operating system which then paints the resulting pre-corrected text. This embodiment may be used when the user preference is set to "render text". When the application 801 needs to display text, pre-correction may be performed by the font rendering module 802, which may implement pre-correction as it would implement a rendering effect like, for example, anti-aliasing.

What is claimed is:

1. A computer-implemented method for rendering on a display of an electronic device a pre-corrected image of an original image to compensate for a second-order visual impairment of a user of the device such that the pre-corrected image when displayed on the display would be perceived by the user to be in better optical focus than the user would perceive a display of the original image, comprising:
receiving hardware characteristics of the display;
receiving at least one parameter describing the visual impairment of the user, wherein the parameter is at least one from the group consisting of: a sphere parameter, a cylinder and axis parameters, and a near point of accommodation or another mathematically-equivalent set of parameters representing the visual impairment of the user;
receiving at least one parameter describing the conditions under which the display is seen by the user;
calculating, directly using the at least one parameter describing the visual impairment of the user, a Point Spread Function (PSF), or another mathematically-equivalent representation of an imaging capability of an eye's optical system including an optical transfer function (OTF);
calculating a pre-corrected image corresponding to at least a portion of the original image to compensate for the visual impairment of the user, using a constrained optimization technique that maximizes perceived quality of the pre-corrected image according to constraints determined by a set of images capable of being displayed according to the hardware characteristics, and
rendering on the display the pre-corrected image,
wherein the rendering comprises a separate pre-correction of text elements of the original image implemented as a rendering effect performed by a font rendering module of an operating system, separate from correction to non-text elements of the original image.

2. The computer-implemented method of claim 1, wherein receiving at least one parameter describing the visual impairment of the user comprises at least one of receiving the visual impairment parameter from a remote database, a local database, real-time input, or real-time estimation.

3. The computer-implemented method of claim 1, wherein receiving at least one parameter describing the conditions under which the display is seen by the user comprises at least one of receiving the display condition parameter from real-time estimation, real-time input, or a local database during the rendering.

4. The computer-implemented method of claim 1, wherein receiving hardware characteristics of the display comprises receiving at least one from the group consisting of pixel dimensions and spacing, display width and height, display reflectivity emission spectra of each of a sub-pixel class, and a relationship between pixel value and luminance.

5. The computer-implemented method of claim 1, wherein receiving a parameter describing the conditions under which the display is seen comprises the step of receiving one or more of a measurement of the distance between the eye of the user and the screen, an ambient luminosity, and a measurement of the pupil size of the user.

6. The computer-implemented method of claim 1, wherein calculating the PSF comprises calculating a polychromatic PSF per sub-pixel class of the display using an emission spectrum of the sub-pixel class and an average photopic spectral sensitivity function of the user's retina, and
wherein rendering on the display the pre-corrected image comprises rendering the pre-corrected image for each sub-pixel class.

7. The computer-implemented method of claim 1, wherein calculating a pre-corrected image is performed using the constrained optimization technique employing a gradient descent or using a Van-Cittert algorithm.

8. The computer-implemented method of claim 1, wherein the constrained optimization technique is formulated based on a metric comprising a variation of sensitivity of eye receptors due to luminance.

9. The computer-implemented method of claim 1, wherein the constrained optimization technique is formulated based on an objective function representing an overall image quality as perceived by the user.

10. The computer-implemented method of claim 1, wherein at least one from the parameters describing the visual impairment of the user and the parameter describing the conditions under which the display is seen is determined by performing a dichotomy test, the dichotomy test comprising: presenting to the user images pre-corrected using different hypotheses.

11. The computer-implemented method of claim 1, further comprising enabling or disabling rendering by striking a hard key, varying an option, shaking the device, or using an embedded camera to detect eyeglasses being worn by the user.

12. The computer-implemented method of claim 1, wherein the pre-correction is done using a PSF of the right eye only, a PSF of the left eye only, or a PSF resulting from a combination of both PSF's of the left and right eyes, or both PSF's of the left and right eyes and applying two pre-correction results to two elements of an autostereoscopic monitor.

13. A system for rendering on a display of an electronic device a pre-corrected image of an original image to compensate for a second-order visual impairment of a user of the device such that the pre-corrected image when displayed on the display would be perceived by the user to be in better optical focus than the user would perceive a display of the original image, comprising:
a computer processor; and
a memory connected to said computer processor, wherein the memory is configured with instructions to cause the processor to
(1) receive hardware characteristics of the display screen from a local database;
(2) receive a parameter describing the visual impairment of the user from at least one of a remote database, a local database, real-time input, or real-time estimation, wherein the parameter is at least one from the group consisting of: a sphere parameter, a cylinder and axis parameters, and a near point of accommodation;
(3) receive a parameter describing a condition under which the display is seen by the user from at least one of real-time estimation, real-time input, or local database;
(4) calculate, directly using the parameter describing the visual impairment of the user, a Point Spread Function (PSF), or another mathematically-equivalent representation of an imaging capability of an eye's optical system including an optical transfer function (OTF);
(5) calculate a pre-corrected image corresponding to at least a portion of the original image to compensate for the visual impairment of the user, using a constrained optimization technique that maximizes perceived quality of the pre-corrected image according to constraints determined by a set of images capable of being displayed according to the hardware characteristics; and
(6) render on the display the pre-corrected image,
wherein rendering on the display the pre-corrected image comprises a separate pre-correction of text elements of the original image implemented as a rendering effect performed by a font rendering module of an operating system, separate from correction to non-text elements of the original image.

14. A non-transitory computer readable storage medium storing a program configured for execution by a processor, the program when executed being adapted to cause the processor to:
receive a hardware characteristic of the display from a database;
receive a parameter describing a second order visual impairment of the user from a remote database, a local database, real-time input, or real-time estimation, wherein the parameter is at least one from the group consisting of: a sphere parameter, a cylinder and axis parameters, and a near point of accommodation;
receive a parameter describing the conditions under which the display is seen by the user from at least one of real-time estimation, real-time input, or local database;
calculate, directly using the parameter describing the visual impairment of the user, a Point Spread Function (PSF), or another mathematically-equivalent representation of an imaging capability of an eye's optical system, including an optical transfer function (OTF);
calculate a pre-corrected image corresponding to at least a portion of an original image to compensate for a user's visual impairment, using a constrained optimization technique that maximizes perceived quality of the pre-corrected image according to constraints determined by a set of images capable of being displayed according to the hardware characteristics; and
render the pre-corrected image on a display of the electronic device, whereby the display of the pre-corrected image would be perceived by the user to be in better optical focus than the user would perceive a display of the original image,
wherein rendering the pre-corrected image on the display comprises a separate pre-correction of text elements of the original image implemented as a rendering effect performed by a font rendering module of an operating system, separate from correction to non-text elements of the original image.

* * * * *